Aug. 22, 1950   C. W. FUELLING   2,520,033
CONCRETE MIXER AND HOIST
Filed May 23, 1946   2 Sheets-Sheet 1
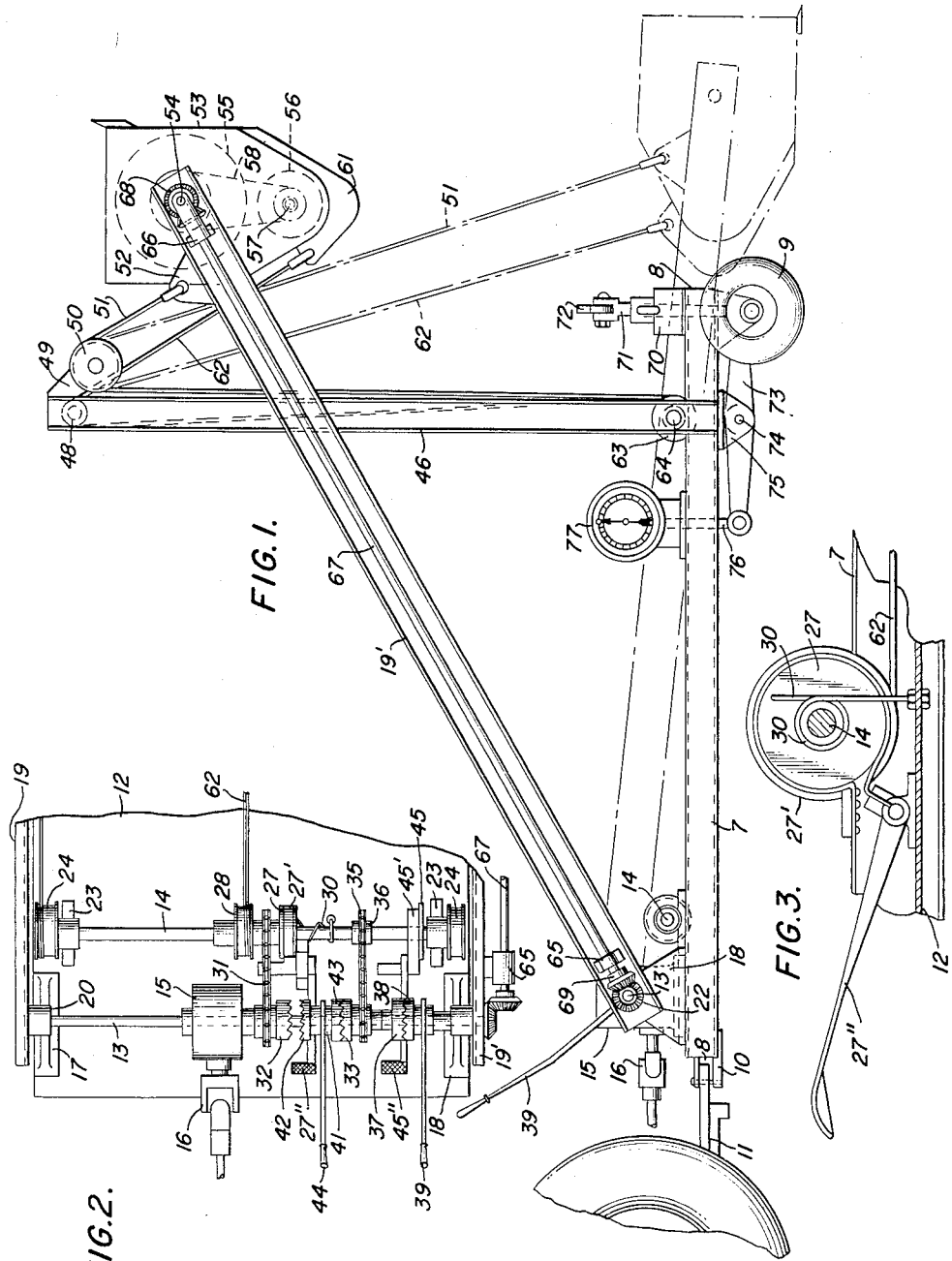
INVENTOR
CHARLES W. FUELLING
BY W. G. Burns
ATTORNEY Aug. 22, 1950     C. W. FUELLING     2,520,033
CONCRETE MIXER AND HOIST
Filed May 23, 1946     2 Sheets-Sheet 2
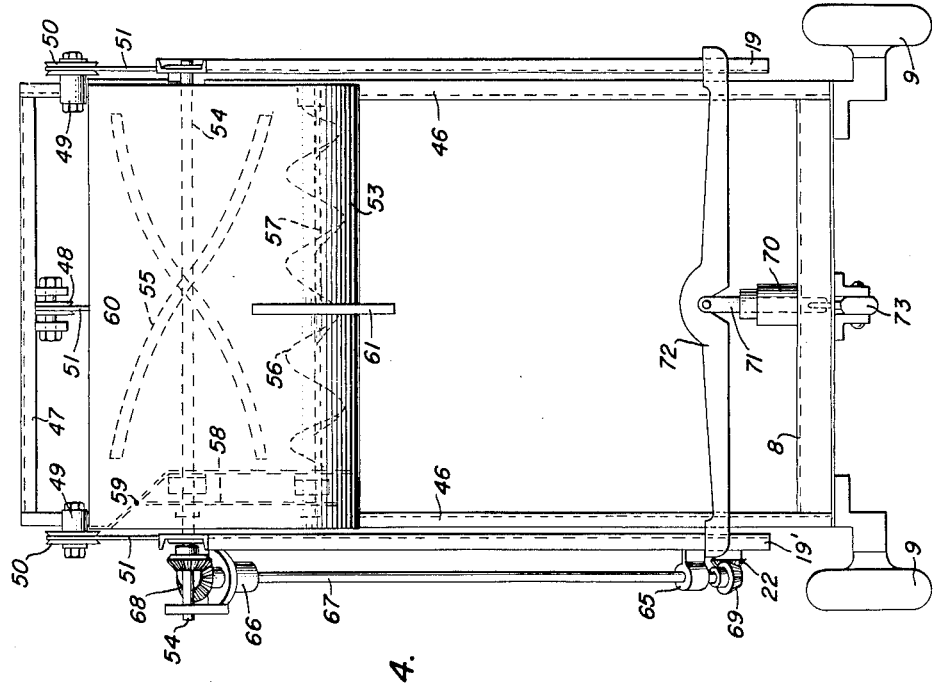
INVENTOR
CHARLES W. FUELLING
BY *H. G. Burns*
ATTORNEY Patented Aug. 22, 1950

2,520,033

UNITED STATES PATENT OFFICE 2,520,033

CONCRETE MIXER AND HOIST

Charles W. Fuelling, Fort Wayne, Ind.

Application May 23, 1946, Serial No. 671,847

11 Claims. (Cl. 259—160)

This invention relates to improvements in a concrete mixer and hoist of the type adapted for use in connection with a tractor.

An object of the invention is to provide an apparatus for mixing batches of concrete forming materials and a hoist therefor arranged upon a chassis in the form of a trailer that is attachable to and partially supported by a tractor so as to be maneuvered about.

Another object of the invention is to afford a concrete mixer and hoist therefor, provided with mechanism for actuating the hoist and the mixing apparatus under manual control.

A further object of the invention is to provide a trailer-supported apparatus by which is facilitated the loading of material deposited on the ground into a skip, agitating the material therein continuously during elevation of the skip, and then dumping the mixed material from the skip while elevated.

Other objects and advantages of the invention appear in the following description.

An illustrative embodiment of the invention is shown in the accompanying drawings, in which:

Fig. 1 is a side elevational view of a structure in which the invention is incorporated, including a fragmentary representation of a tractor by which the apparatus is partially supported;

Fig. 2 is a fragmentary top plan view of the hoisting mechanism projected from Fig. 1;

Fig. 3 is a fragmentary elevational view of a brake mechanism used in the appliance, partly in section;

Fig. 4 is a front end elevational view of the structure shown in Fig. 1;

Fig. 5 is a fragmentary elevational view of the drum-shaft and associated parts for the hoist, parts being in section; and Fig. 6 is a similar view of the clutch-shaft and associated parts shown in section.

The illustrative embodiment of the invention consists of a chassis frame and superimposed supporting structure thereon, a boom pivoted on said frame, a skip having agitators therein supported pivotally on said boom, gearing for activating the agitators, and hoisting mechanism having cable connections by which to elevate and dump the skip.

The chassis frame preferably is formed of side and end beams 7 and 8 respectively, the front end of the frame being provided with ground-wheels 9, and the rear end having a coupler 10 which, when connected with the frame of a tractor 11, supports the frame in elevated position above the ground.

The rear end portion of the frame has thereon a platform 12 upon which is mounted hoisting mechanism which includes a transversely disposed drive-shaft 13 and a countershaft 14 parallel therewith. On the platform is disposed a motion transmission gearing 15, of any suitable type, through which the drive-shaft 13 extends to be actuated thereby. The transmission gearing is motivated by power derived from the tractor engine (not shown) through the medium of a universal jointed coupling 16 connected therewith.

Upon the platform 12 adjacent the sides thereof are positioned brackets 17 and 18 respectively, and a pair of booms 19—19' provided with cylindrical trunnions 20—20' that extend loosely through the corresponding brackets, and affording pivotal supports for said booms adapted to permit free vertical swinging movement thereof.

A sleeve 21 (Fig. 6) extends concentrically through one of the trunnions 20' and has keyed on its outer extending end a mitre gear 22, and the corresponding end of the drive-shaft 13 extends loosely through said sleeve so as to have bearing and free turning movement therein. The opposite end of the drive-shaft 13 extends loosely through the corresponding trunnion 20 in which it has free turning movement.

Upon the platform 12 are positioned another pair of brackets 23 through which the ends of the countershaft 14 loosely extend and have keyed thereon corresponding winding drums 24.

On the countershaft 14 (Fig. 5) is concentrically disposed a loose thimble 25 between collars 26 secured upon the countershaft to prevent end play of the thimble, and upon said thimble is keyed a brake-drum 27, a third winding drum 28 and a driven sprocket wheel 29, the arrangement being such that the brake-drum, sprocket and said winding drum have concurrent rotary movement about the countershaft. A spiral spring 30 encompasses the countershaft 14, one of its ends being secured to the platform 12 and its other end connected to the brake-drum 27 so that, upon rotation of the brake-drum, sprocket wheel and the winding drum 28 in one direction as a unit, winding of the spring and tensioning thereof occurs with consequent storage of reactionary mechanical force. Rotary movement is imparted to this unit by a sprocket chain 31 that has engagement with the driven sprocket-wheel 29 and a sprocketed clutch member 32 which is loosely mounted on the drive-shaft 13 (Fig. 2). Upon the drive-shaft 13 is loosely mounted an idler-clutch 33 having keyed on its hub 33' a driver sprocket-wheel 34 that is operatively connected, by means of a chain 35, with another driven sprocket-wheel 36 keyed on the countershaft 14. The brake-drum 27 has thereon a brake-band 27' operated by a pedal lever 27" whereby movement of the brake-drum is regulated or arrested in any selected position at any stage of rotation thereof, as selected by the operator, accordingly as the pedal lever is manipulated.

A drive-clutch head 37 is keyed to the drive-shaft 13, and upon the inner end portion of the sleeve 21 is disposed a splined clutch member 38 adapted for engagement with the drive-clutch head 37, there being provided an operating lever 39 pivotally mounted on a lug 40 secured to the platform 12 by which to shift said head. A clutch dog 41 is splined on the drive-shaft 13 and has opposite engaging ends 42 and 43 that have engagement selectively with the loose clutch member 32 on the drive-shaft or the idler-clutch 33 accordingly as the clutch dog is shifted by means of an operating lever 44 therefor provided.

A second brake-drum 45 (Fig. 2) is secured upon the countershaft 14 which is provided with a brake band 45' controlled by another pedal lever 45" by which rotation of the countershaft 14 is manually controlled.

A derrick is mounted upon the chassis frame adjacent the front end thereof, preferably formed of upright beams 46 secured at their lower ends to the side beams 7 and connected at their tops by a cross-beam 47 which is provided with a pendently mounted pulley 48. Adjacent the upper ends of the beams 46, on brackets 49 secured thereon, are sheaves 50 over which are trained cables 51 that are connected at one of their ends to cleats 52 that are secured to the booms 19—19' adjacent their outer ends, the opposite ends of said cables being attached to the corresponding winding drums 24 on the ends of the countershaft 14, so that the booms swing upward or downward accordingly as the countershaft is turned in one direction or the other.

A skip 53 is disposed between the outer ends of said booms upon a shaft 54 that extends loosely through the skip and the booms, in which said shaft is revolubly movable.

Upon the shaft is secured an agitator 55 of usual construction, and a second agitator 56 having a shaft 57 is mounted in the lower part of the skip, the lower agitator shaft being operatively connected with the upper shaft 54 by means of a chain and sprocket mechanism 58 located in a shelter 59 built into the mixing chamber 60 of the skip. By this means when activated the agitators revolve concurrently and the content of transient material within the mixing chamber thereby is kept in circulation.

The lower end of the skip has thereon a downwardly extending rib 61, and a trip cable 62 is connected at one of its ends to said rib, and extends over the pulley 48 in the upper end of the derrick, from thence downward under one of a series of idlers 63 that are mounted on a transverse shaft 64 in the lower part of the derrick, and from thence around the third winding drum 28 to which the rear end of the trip cable is secured.

Upon the boom 19' adjacent each end portion thereof, is secured a bracket 65—66 in which is rotatably mounted a transmission shaft 67, the outer end of which is operatively connected with the upper agitator shaft 54 by means of mitre gears 68, and the opposite end of said transmission shaft is provided with a mitre gear 69 that meshes with the gear 22 (Fig. 6). The arrangement is such that upon rotation of the gear 22 the agitators 55 and 56 are activated through the media of the transmission shaft 67, mitre gears 68 and the chain and sprocket mechanism 58.

A weight indicating appliance is mounted on the front end of the chassis by which is determined the quantity of transient material when loaded into the skip. Preferably, the weighing appliance has a spring or other yielding weight resistor 70 secured on the front beam 8 of the chassis and upon which is supported a post 71 that has fulcrumed thereon a removable cross-beam 72. The post extends loosely through the resistor and its lower end has pivoted connection with a teeter bar 73 disposed upon a pivot 74 in a pendent bracket 75 on the chassis frame. The teeter bar has at its rear end pivotal connection with the stem 76 of a weight indicator 77, of any suitable type, which is positioned on the chassis frame.

Operation

In operating the apparatus, the drive-shaft 13 is revolved continuously by power derived from the tractor through the medium of the transmission gearing 15 while the clutch dog 41 is out of engaging position. Upon moving the splined clutch member 38 into engagement with the drive-clutch head 37 the agitators in the skip are set in motion. By shifting the clutch dog 41 into engagement with the idler-clutch 33, movement thereupon is imparted to the countershaft 14, through the medium of the chain 35 and its associated sprocket members, whereupon the cables 51 are wound upon the drums 24 causing elevation of the booms and the skip supported thereon, and incidentally relieving the tension on the trip cable 62 which thereupon becomes wound upon the third winding drum 28 which is revolved due to reactionary force of the spiral spring 30. In this manner the slack of the trip cable is taken up as the skip is raised. After manipulating the pedal lever 27" and the skip has been elevated to a selected position the clutch dog 41 is moved out of engagement with the idler-clutch 33 by manipulating the operating lever 44 into engagement with the sprocketed clutch 32 whereupon the unit composed of the brake-drum 27, winding drum 28 and sprocket wheel 29 are revolved, causing winding of the trip cable 62 around the drum 28 and consequent tipping of the skip to dumping position. By manipulation of the brake pedal 27" the skip is selectively retained in its dumping position or released to permit its return to normal upright position.

After the skip has been elevated by the booms to a selected position it is there held by manipulation of the brake pedal 45" and the agitators continue in motion until the splined clutch member 38 is thrown out of action. The skip is lowered by relieving the pressure on the brake pedal 45" whereupon the skip together with the booms descend of their own weight and the concurrent pull of the trip cable 62 causes unwinding thereof from its drum 28 and retensioning of the take-up spring 30. By this action, the skip upon reaching the ground is tilted into position for receiving material lying on the ground and becomes loaded upon forward movement of the chassis forced by the tractor.

The weight of the material loaded into the skip is determined by partially elevating the skip and placing the cross-beam 72 upon the post 71 and then lowering the booms so as to rest on the ends of the cross-beam whereupon the weight indicator 77 is activated. In this position the skip may be loaded conveniently from a truck and the weight of the material ascertained from time to time as the load increases until a predetermined weight is reached. In this manner the concrete aggregate in definite quantities is loaded into the skip to which a desired amount of water is added after which the mass is continuously agitated and thus thoroughly mixed until finally dumped from the skip at the place of final delivery.

Variations from the particular construction above disclosed may be resorted to by the exercise of skill in the art, without departure from the spirit or scope of the invention.

What I claim is:

1. A hoist and mixer for concrete consisting of a chassis frame provided at its front end with ground wheels and supported at its rear end by a tractor, a derrick surmounting the front portion of said frame provided at its upper end with a pendent pulley and laterally disposed sheaves, a hoist mechanism disposed on the rear portion of said frame including a bracket at each side thereof, a pair of booms having trunnions extending loosely into said brackets respectively, a skip having an agitator therein provided with a shaft the ends of which extend through the outer ends of said booms, a transmission shaft rotatably mounted on one of said booms having geared connections with said hoist mechanism and the agitator shaft, cables trained over said sheaves connecting drums on said hoist mechanism and said booms wherefore to elevate same, said skip being adapted to function as a scoop when in lowermost position and as a mixer when elevated, a trip cable trained over said pulley connecting another drum on said hoist mechanism and the skip wherefore to invert said skip, and manually-operated means controlling said hoist mechanism.

2. A hoist and concrete mixer consisting of a wheeled chassis having thereon a derrick, a tractor-powered manually controlled hoist mechanism on said chassis, booms, the rear ends of which are pivotally supported on the chassis and extend astride said derrick, a skip having an agitator therein provided with a shaft the ends of which extend through said booms supporting said skip, cables trained over sheaves on said derrick connecting drums on said hoist mechanism with said booms to elevate said booms, a trip cable trained over a pulley on said derrick connecting another drum on said hoist mechanism with said skip for inverting said skip, said skip being adapted to function as a scoop when in lowermost position and as a mixer when elevated, and power transmission means connecting said hoist mechanism and said agitator shaft.

3. A concrete mixer and hoist therefor consisting of a wheeled chassis having thereon a derrick and tractor-powered manually controlled hoist mechanism, booms disposed astride said derrick and pivotally supported in connection with said chassis, a skip pivotally supported on said booms having rotatable agitators mounted therein, power transmitting mechanism having connections respectively with said agitators and the hoist mechanism wherefore to actuate the agitators, cables trained over sheaves on said derrick connected with drums on said hoist mechanism and said booms to elevate the booms, a trip cable trained over a pulley on said derrick connected with another drum on said hoist mechanism and the skip wherefore to tilt the skip into dumping position, said skip being adapted to function as a scoop when in lowermost position, and scales mechanism on said chassis provided with a removable beam engageable by said booms whereby to ascertain the weight of material as loaded into the skip.

4. A mechanism for mixing and hoisting concrete consisting of a wheeled chassis provided with a derrick and hoist mechanism having a drive-shaft and a countershaft, booms pivotally supported on the chassis, a skip pivoted on said booms, operable as a scoop when the booms are in lowermost position, provided with an agitator therein, a power transmission means operatively connecting the agitator and said mechanism, said hoist mechanism having connection with a tractor to be activated thereby and provided with winding drums thereon, cables trained over sheaves on the derricks connected with said drums and booms by which the booms are elevated, a spring-restrained member loosely mounted on said countershaft having another winding drum, a trip cable trained over a pulley on said derrick and connected with said other drum and skip by which to invert said skip, a loosely mounted clutch member on the drive-shaft having operative connection with said spring-restrained member to activate same, another loosely mounted clutch-member on said countershaft, a clutch dog splined on the drive-shaft, provided with an operating lever therefor, selectively engageable with said loosely mounted clutch members, another clutch member, provided with an operating lever therefor, having splined relation with said transmission mechanism, and brake mechanisms connected respectively with said countershaft and said other winding drum provided with operating levers controlling same.

5. A movable mixing and hoisting apparatus for concrete consisting of a wheeled chassis having a derrick thereon, a hoist on said chassis having a drive-shaft motivated by a tractor connected with said chassis, a countershaft operatively connected with said drive-shaft manually controlled by an operating lever, pivoted booms in connection with said hoist disposed astride said derrick, a skip having an agitator therein operatively connected with said drive-shaft, adaptable as a scoop when said booms are in lowermost position, hoisting cables trained over sheaves on the derrick connected with winding drums on the countershaft and said booms to elevate the latter, a spring-restrained take-up mechanism loosely mounted on said countershaft including another winding drum and a manually controlled brake mechanism therefor, a trip cable trained over a pulley on said derrick connected with said other drum and the skip to tilt the latter into dumping position, another manually controlled brake mechanism for said other winding drum, and a clutch dog splined on said drive-shaft, provided with an operating lever therefor, selectively engageable with the respective mechanisms for hoisting the booms and tilting said skip.

6. A movable concrete mixing and hoisting apparatus consisting of a wheeled chassis attached to a tractor provided with a derrick, a hoist mechanism thereon motivated by the engine of said tractor and pivoted booms on which is supported a skip having therein an agitator, hoisting cables trained over sheaves on the derrick connected with winding drums on the hoist by which to elevate the skip, a transmission means connecting the hoist and said agitator provided with means to throw said transmission mechanism into and out of action, a trip cable trained over a pulley on said derrick connected with a spring-retracted drum on the hoist mechanism and said skip to invert the latter, and manually operated brake mechanisms in connection with the hoist for controlling the elevating and inverting operations.

7. An apparatus for mixing and hoisting a concrete batch, said apparatus having a chassis, a superimposed derrick and booms supporting a skip pivotally disposed on said booms provided with an agitator therein, and a hoist mechanism on the chassis, said hoist mechanism having a drive-shaft and a countershaft provided with winding drums, cables trained over sheaves on said derrick connecting said drums and booms wherefore to elevate said skip, mechanism connecting said hoist mechanism and said agitator, a manually controlled brake on said countershaft, another winding drum loosely mounted on said countershaft having a manually controlled brake therefor, a trip cable trained over a pulley on said derrick connected with said other winding drum and said skip, a clutch mechanism on said drive-shaft operatively connected with said other winding drum, and a clutch dog on the drive-shaft selectively engageable with the hoisting and tilting mechanisms.

8. Apparatus for mixing and hoisting concrete batches, said apparatus consisting of a wheeled chassis provided with a derrick and pivoted booms, a tilting skip carried by said booms adapted to function as a scoop when the booms are in lowermost position, and having an agitator therein, a hoist mechanism on said chassis having cable connections trained over sheaves on said derrick and connected with said booms, whereby to hoist the booms, a trip cable in connection with the hoist mechanism trained over a pulley on said derrick and connected with the skip whereby to tilt the latter, and a power transmission mechanism supported by one of said booms, geared to said hoist mechanism and said agitator, provided with means to throw same into and out of action, and manually operated means for controlling said hoist mechanism.

9. A hoist mechanism for apparatus that has a skip provided with an agitator therein and elevating means for said skip, said elevating means consisting of a hoist having a drive-shaft provided with manually operated clutch members thereon and operative connection with said agitator, a countershaft having means in connection with said drive-shaft to be actuated thereby, a spring-restrained member having a winding drum loosely mounted on said countershaft provided with a manually controlled brake, a trip cable connecting said drum and skip by which to tilt said skip, and a manually controlled brake for said countershaft.

10. In apparatus for mixing and hoisting concrete, a chassis having thereon a hoist mechanism including a drive-shaft and a countershaft operatively connected therewith, a boom structure pivotally supported in axial alinement with said drive-shaft and having thereon a power transmission shaft, a derrick on said chassis provided with sheaves and including cables extending over said sheaves connecting said hoist mechanism and the outer end portion of said boom structure to elevate said structure, a skip provided with an agitator therein having a shaft supported by said boom structure and upon which the skip has tilting movement, said transmission shaft having geared connection with said drive and agitator shafts whereby to activate the agitator, a trip cable having operative connection with said hoist mechanism by which to tilt the skip, power means to actuate said drive-shaft, and manually operated means for controlling the hoist mechanism.

11. A concrete loading, mixing and dumping appliance consisting of a tractor-motivated chassis provided with a derrick and hoisting mechanism thereon having connection with the power take-off of said tractor, and a skip having agitators therein provided with means in connection with the hoisting mechanism for activating it, said skip being adaptable as a scoop when in lowermost position and said chassis is moved forwardly, and as a mixer when said skip is hoisted.

CHARLES W. FUELLING.

REFERENCES CITED

The following references are of record in the file of this patent:

UNITED STATES PATENTS

| Number | Name | Date |
| --- | --- | --- |
| 886,680 | Crowe | May 5, 1908 |
| 1,065,608 | Hennessy | June 24, 1913 |
| 1,198,530 | Droughton | Sept. 19, 1916 |
| 2,100,229 | Van Orden | Nov. 23, 1937 |

FOREIGN PATENTS

| Number | Country | Date |
| --- | --- | --- |
| 183,543 | Great Britain | July 21, 1922 |
| 261,910 | Great Britain | Dec. 2, 1926 |